US011395989B2

(12) United States Patent
Quanci et al.

(10) Patent No.: US 11,395,989 B2
(45) Date of Patent: Jul. 26, 2022

(54) METHODS AND SYSTEMS FOR PROVIDING CORROSION RESISTANT SURFACES IN CONTAMINANT TREATMENT SYSTEMS

(71) Applicant: SUNCOKE TECHNOLOGY AND DEVELOPMENT LLC, Lisle, IL (US)

(72) Inventors: John Francis Quanci, Haddonfield, NJ (US); Mayela Carolina Fernandez, Lisle, IL (US); Daniel C. Charles, Lisle, IL (US)

(73) Assignee: SUNCOKE TECHNOLOGY AND DEVELOPMENT LLC, Lisle, IL (US)

(*) Notice: Subject to any disclaimer, the term of this patent is extended or adjusted under 35 U.S.C. 154(b) by 275 days.

(21) Appl. No.: 16/729,122

(22) Filed: Dec. 27, 2019

(65) Prior Publication Data

US 2020/0206683 A1 Jul. 2, 2020

Related U.S. Application Data

(60) Provisional application No. 62/787,055, filed on Dec. 31, 2018.

(51) Int. Cl.
*B01D 53/50* (2006.01)
*B01D 53/68* (2006.01)
(Continued)

(52) U.S. Cl.
CPC ......... *B01D 53/504* (2013.01); *B01D 53/505* (2013.01); *B01D 53/68* (2013.01);
(Continued)

(58) Field of Classification Search
CPC .......... B01D 53/505; B01D 2258/0283; B01D 2251/404; B01D 2257/2045; B01D 53/68;
(Continued)

(56) References Cited

U.S. PATENT DOCUMENTS

| 425,797 A | 4/1890 | Hunt |
| 469,868 A | 3/1892 | Osbourn |

(Continued)

FOREIGN PATENT DOCUMENTS

| CA | 1172895 | 8/1984 |
| CA | 2775992 | 5/2011 |

(Continued)

OTHER PUBLICATIONS

U.S. Appl. No. 16/828,448, filed Mar. 24, 2020, Quanci et al.

(Continued)

*Primary Examiner* — Timothy C Vanoy
(74) *Attorney, Agent, or Firm* — Perkins Coie LLP

(57) ABSTRACT

Systems and apparatuses for neutralizing acidic compounds in flue gases emitted from a heat recovery coke oven. A representative system includes a spray dry absorber having a barrel that includes a plurality of wall plates that form sidewalls of the barrel. The wall plates include a steel plate and a corrosion resistant alloy cladded to the steel plate and the wall plates are oriented such that the corrosion resistant alloy faces toward and is in fluid communication with an interior area of the barrel. The alloy is resistant to corrosion caused by the acidic compounds in the flue gas and can prevent the steel plate from being corroded by these acidic compounds.

25 Claims, 11 Drawing Sheets

(51) Int. Cl.
*B01D 53/79* (2006.01)
*B01D 53/80* (2006.01)

(52) U.S. Cl.
CPC ............ *B01D 53/79* (2013.01); *B01D 53/80* (2013.01); *B01D 2257/2045* (2013.01); *B01D 2257/302* (2013.01)

(58) Field of Classification Search
CPC ............ B01D 2257/302; B01D 53/80; B01D 53/504; B01D 53/79; B01D 1/16; B01D 1/20; B01D 53/26; C23F 11/00; C23F 15/00; B01J 2219/24; B01J 2219/2441; A62D 5/00; Y10S 55/30
See application file for complete search history.

(56) References Cited

U.S. PATENT DOCUMENTS

| | | |
|---|---|---|
| 760,372 A | 5/1904 | Beam |
| 845,719 A | 2/1907 | Schniewind |
| 976,580 A | 7/1909 | Krause |
| 1,140,798 A | 5/1915 | Carpenter |
| 1,424,777 A | 8/1922 | Schondeling |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Such |
| 2,667,185 A | 1/1954 | Beavers |
| 2,723,725 A | 11/1955 | Keiffer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 3,015,893 A | 1/1962 | McCreary |
| 3,026,715 A | 3/1962 | Briggs |
| 3,033,764 A | 5/1962 | Hannes |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,462,345 A | 8/1969 | Kernan |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobie et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shorten et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |

(56) References Cited

U.S. PATENT DOCUMENTS

| | | |
|---|---|---|
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,298,497 A * | 11/1981 | Colombo ............ B01D 53/508 110/343 |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,017,214 A | 1/2000 | Sturgulewski |
| 6,059,932 A | 5/2000 | Sturgulewski |
| 6,126,910 A * | 10/2000 | Wilhelm ............ B01D 53/40 423/210 |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |

(56) References Cited

U.S. PATENT DOCUMENTS

| | | |
|---|---|---|
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 | 11/2015 | West et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,526,541 B2 | 1/2020 | West et al. |
| 10,578,521 B1 | 3/2020 | Dinakaran et al. |
| 10,732,621 B2 | 8/2020 | Cella et al. |
| 10,877,007 B2 | 12/2020 | Steele et al. |
| 11,008,517 B2 | 5/2021 | Chun et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0220840 A1 | 11/2004 | Bonissone et al. |
| 2005/0087767 A1 | 4/2005 | Fitzgerald et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0061018 A1 | 3/2014 | Sarpen et al. |
| 2014/0083836 A1 | 3/2014 | Quanci et al. |
| 2014/0156584 A1 | 6/2014 | Motukuri et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0208997 A1 | 7/2014 | Alferyev et al. |
| 2014/0224123 A1 | 8/2014 | Walters |
| 2014/0262139 A1 | 9/2014 | Choi et al. |
| 2014/0262726 A1 | 9/2014 | West et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0219530 A1 | 8/2015 | Li et al. |
| 2015/0226499 A1 | 8/2015 | Mikkelsen |
| 2015/0247092 A1 | 9/2015 | Quanci et al. |
| 2015/0361346 A1 | 12/2015 | West et al. |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0186063 A1 | 6/2016 | Quanci et al. |
| 2016/0186064 A1 | 6/2016 | Quanci et al. |
| 2016/0186065 A1 | 6/2016 | Quanci et al. |
| 2016/0222297 A1 | 8/2016 | Choi et al. |

(56) References Cited

U.S. PATENT DOCUMENTS

| | | |
|---|---|---|
| 2016/0319197 A1 | 11/2016 | Quanci et al. |
| 2016/0319198 A1 | 11/2016 | Quanci et al. |
| 2017/0015908 A1 | 1/2017 | Quanci et al. |
| 2017/0182447 A1 | 6/2017 | Sappok et al. |
| 2017/0183569 A1 | 6/2017 | Quanci et al. |
| 2017/0253803 A1 | 9/2017 | West et al. |
| 2017/0261417 A1 | 9/2017 | Zhang |
| 2017/0313943 A1 | 11/2017 | Valdevies |
| 2017/0352243 A1 | 12/2017 | Quanci et al. |
| 2018/0340122 A1 | 11/2018 | Crum et al. |
| 2019/0099708 A1 | 4/2019 | Quanci |
| 2019/0161682 A1 | 5/2019 | Quanci et al. |
| 2019/0169503 A1 | 6/2019 | Chun et al. |
| 2019/0317167 A1 | 10/2019 | LaBorde et al. |
| 2019/0352568 A1 | 11/2019 | Quanci et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2021/0130697 A1 | 5/2021 | Quanci et al. |
| 2021/0163821 A1 | 6/2021 | Quanci et al. |
| 2021/0163822 A1 | 6/2021 | Quanci et al. |
| 2021/0163823 A1 | 6/2021 | Quanci et al. |
| 2021/0198579 A1 | 7/2021 | Quanci et al. |
| 2021/0340454 A1 | 11/2021 | Quanci et al. |
| 2021/0363426 A1 | 11/2021 | West et al. |
| 2021/0363427 A1 | 11/2021 | Quanci et al. |
| 2021/0371752 A1 | 12/2021 | Quanci et al. |
| 2021/0388270 A1 | 12/2021 | Choi et al. |
| 2022/0056342 A1 | 2/2022 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 105137947 A | 12/2015 |
| CN | 105189704 A | 12/2015 |
| CN | 105264448 A | 1/2016 |
| CN | 105467949 A | 4/2016 |
| CN | 106661456 A | 5/2017 |
| CN | 106687564 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 | 1/1987 |
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 | 5/1996 |
| JP | H10273672 A | 10/1998 |
| JP | H11-131074 | 5/1999 |
| JP | H11256166 A | 9/1999 |

(56) References Cited

FOREIGN PATENT DOCUMENTS

| | | |
|---|---|---|
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 1020050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016086322 | 6/2016 |

OTHER PUBLICATIONS

U.S. Appl. No. 16/845,530, filed Apr. 10, 2020, Quanci et al.
U.S. Appl. No. 16/897,957, filed Jun. 10, 2020, Ball et al.
U.S. Appl. No. 17/076,563, filed Oct. 21, 2020, Crum et al.
International Search Report and Written Opinion for PCT/US2019/068815; dated Apr. 29, 2020, 11 pages.
U.S. Appl. No. 16/428,014, filed May 31, 2019, Quanci et al.
U.S. Appl. No. 16/704,689, filed Dec. 5, 2019, West et al.
U.S. Appl. No. 16/729,036, filed Dec. 27, 2019, Quanci et al.
U.S. Appl. No. 16/729,053, filed Dec. 27, 2019, Quanci et at.
U.S. Appl. No. 16/729,057, filed Dec. 27, 2019, Quanci et at.
U.S. Appl. No. 16/729,068, filed Dec. 27, 2019, Quanci et at.
U.S. Appl. No. 16/729,129, filed Dec. 27, 2019, Quanci et at.
U.S. Appl. No. 16/729,157, filed Dec. 27, 2019, Quanci et at.
U.S. Appl. No. 16/729,170, filed Dec. 27, 2019, Quanci et at.
U.S. Appl. No. 16/729,201, filed Dec. 27, 2019, Quanci et al.
U.S. Appl. No. 16/729,212, filed Dec. 27, 2019, Quanci et at.
U.S. Appl. No. 16/729,219, filed Dec. 27, 2019, Quanci et at.
U.S. Appl. No. 16/735,103, filed Jan. 6, 2020, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.

(56) References Cited

OTHER PUBLICATIONS

Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
JP 03-197588, Inoue Keizo et al., Method and Equipment For Boring Degassing Hole in Coal Charge in Coke Oven, Japanese Patent (Abstract Only) Aug. 28, 1991.
JP 04-159392, Inoue Keizo et al., Method and Equipment For Opening Hole For Degassing of Coal Charge in Coke Oven, Japanese Patent (Abstract Only) Jun. 2, 1992.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case#1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 ** pp. 8-11 *.
Refractories for Ironmaking and Steelmaking: A History of Battles over High Temperatures; Kyoshi Sugita (Japan, Shaolin Zhang), 1995, p. 160, 2004, 2-29.
"Resources and Utilization of Coking Coal in China," Mingxin Shen ed., Chemical Industry Press, first edition, Jan. 2007, pp. 242-243, 247.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker, et al., "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https://forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Pat. No. 6,596,128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus for Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus for Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.
U.S. Appl. No. 12/403,391, filed Mar. 13, 2009, now U.S. Pat. No. 8,172,930, titled Cleanable in Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation with Gas Sharing Providing Extended Process Cycle.
U.S. Appl. No. 14/921,723, filed Oct. 23, 2015, titled Reduced Output Rate Coke Oven Operation with Gas Sharing Providing Extended Process Cycle.
U.S. Appl. No. 14/655,204, now U.S. Pat. No. 10,016,714, filed June 24, 2015, titled Systems and Methods for Removing Mercury From Emissions.
U.S. Appl. No. 16/000,516, filed Jun. 5, 2018, titled Systems and Methods for Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564 filed Jan. 4, 2021, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No, 9,273,249, titled Systems and Methods for Controlling Air Distribution in a Coke Oven.
U.S. Appl. No. 14/655,013, filed Jun. 23, 2015, titled Vent Stack Lids and Associated Systems and Methods.
U.S. Appl. No. 13/843,166, now U.S. Pat. No. 9,273,250, filed Mar. 15, 2013, titled Methods and Systems for Improved Quench Tower Design.
U.S. Appl. No. 15/014,547, filed Feb. 3, 2016, now, U.S. Pat. No. 10,927,303, titled Methods for Improved Quench Tower Design.

(56) References Cited

OTHER PUBLICATIONS

U.S. Appl. No. 17/155,818, filed Jan. 22, 2021, titled Methods and Systems for Improved Quench Tower Design.
U.S. Appl. No. 14/655,003, filed Jun. 23, 2015, titled Systems and Methods for Maintaining a Hot Car in a Coke Plant.
U.S. Appl. No. 16/897,957, filed Jun. 10, 2020, titled Systems and Methods for Maintaining a Hot Car in a Coke Plant.
U.S. Appl. No. 13/829,588, now U.S. Pat. No. 9,193,915, filed Mar. 14, 2013, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 16/704,689, filed Dec. 5, 2019, titled Horizontal Heat Recovery Coke Ovens Having Monolith Crowns.
U.S. Appl. No. 17/190,720, filed Mar. 3, 2021, titled Coke Ovens Having Monolith Component Construction.
U.S. Appl. No. 13/589,009, filed Aug. 17, 2012, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, filed Feb. 16, 2021, titled Automatic Draft Control System For Coke Plants.
U.S. Appl. No. 13/588,996, now U.S. Pat. No. 9,243,186, filed Aug. 17, 2012, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing, now U.S. Pat. No. 10,041,002.
U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, titled Coke Plant Including Exhaust Gas Sharing.
U.S. Appl. No. 13/589,004, now U.S. Pat. No. 9,249,357, filed Aug. 17, 2012, titled Method and Apparatus for Volatile Matter Sharing in Stamp-Charged Coke Ovens.
U.S. Appl. No. 13/730,673, filed Dec. 28, 2012, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed Mar. 3, 3021, titled Exhaust Flow Modifier, Duck Intersection Incorporating the Same, and Methods Therefor.
U.S. Appl. No. 13/598,394, now U.S. Pat. No. 9,169,439, filed Aug. 29, 2012, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, titled Coke Oven Charging System.
U.S. Appl. No. 15/443,246, now U.S. Pat. No. 9,976,089, filed Feb. 27, 2017, titled Coke Oven Charging System.
U.S. Appl. No. 14/587,670, filed Dec. 31, 2014, now U.S. Pat. No. 10,619,101, titled Methods For Decarbonizing Coking Ovens, and Associated Systems and Devices.
U.S. Appl. No. 16/845,530, filed Apr. 10, 2020, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi-Modal Beds of Coking Material.
U.S. Appl. No. 17/228,469, filed Apr. 12, 2021, titled Multi-Modal Beds Of Coking Material.
U.S. Appl. No. 17/228,501, filed Apr. 12, 2021, titled Multi-Modal Beds of Coking Material.
U.S. Appl. No. 14/987,625, filed Jan. 4, 2016, titled Integrated Coke Plant Automation and Optimization Using Advanced Control and Optimization Techniques.
U.S. Appl. No. 17/172,476, filed Feb. 10, 2021, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, titled Method and System for Optimizing Coke Plant Operation and Output.
U.S. Appl. No. 14/839,551, filed Aug. 28, 2015, now U.S. Pat. No. 10,308,876, titled Burn Profiles For Coke Operations.
U.S. Appl. No. 16/428,014, filed May 31, 2019, now U.S. Pat. No. 10,920,148, titled Improved Burn Profiles for Coke Operations.
U.S. Appl. No. 17/155,219, filed Jan. 22, 2021, titled Improved Burn Profiles For Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, titled Method and System for Dynamically Charging a Coke Oven.
U.S. Appl. No. 15/614,525, filed Jun. 5, 2017, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17,076,563, filed Oct. 21, 2020, titled System and Method for Repairing a Coke Oven.
U.S. Appl. No. 17/135,483, filed Dec. 28, 2020, titled Oven Health Optimization Systems and Methods.
U.S. Appl. No. 16/729,053, filed Dec. 27, 2019, titled Oven Uptakes.
U.S. Appl. No. 16/729,036, filed Dec. 27, 2019, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,068, filed Dec. 27, 2019, titled Systems and Methods for Utilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, titled Coke Plant Tunnel Repair and Flexible Joints.
U.S. Appl. No. 16/729,170, filed Dec. 27, 2019, titled Coke Plant Tunnel Repair and Anchor Distribution.
U.S. Appl. No. 16/729,157, filed Dec. 27, 2019, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, titled Decarbonization of Coke Ovens and Associated Systems and Methods.
U.S. Appl. No. 16/729,212, filed Dec. 27, 2019, now U.S. Pat. No. 11,021,655, titled Heat Recovery Oven Foundation.
U.S. Appl. No. 16/729,219, filed Dec. 27, 2019, titled Spring-Loaded Heat Recovery Oven System and Method.
U.S. Appl. No. 17/306,895, filed May 3, 2021, titled High-Quality Coke Products.
U.S. Appl. No. 17/155,818, filed Jan. 22, 2021, Choi et al.
U.S. Appl. No. 17/190,720, filed Mar. 3, 2021, West et al.
U.S. Appl. No. 17/191,119, filed Mar. 3, 2021, Quanci et al.
U.S. Appl. No. 17/222,886, filed Apr. 5, 2021, Quanci et al.
U.S. Appl. No. 17/228,469, filed Apr. 12, 2021, Quanci et al.
U.S. Appl. No. 17/228,501, filed Apr. 12, 2021, Quanci et al.
U.S. Appl. No. 17/306,895, filed May 3, 2021, Quanci et al.
U.S. Appl. No. 17/321,857, filed May 17, 2021, Quanci et al.

(56) References Cited

OTHER PUBLICATIONS

U.S. Appl. No. 17/320,343, filed May 24, 2021, Quanci et al.
U.S. Appl. No. 17/363,701, filed Jun. 30, 2021, Quanci et al.
U.S. Appl. No. 17/388,874, filed Jul. 29, 2021, Quanci et al.
U.S. Appl. No. 17/459,380, filed Aug. 27, 2021, Quanci et al.
U.S. Appl. No. 17/471,491, filed Sep. 10, 2021, West et al.
U.S. Appl. No. 17/521,061, filed Nov. 8, 2021, Crum et al.
U.S. Appl. No. 17/626,477, filed Nov. 8, 2021, Quanci et al.
U.S. Appl. No. 17/532,058, filed Nov. 22, 2021, Quanci et al.
Practical Technical Manual of Refractories, Baoyu Hu, etc., Beijing: Metallurgical Industry Press, Chapter 6; 2004, 6-30. Chinese only.

* cited by examiner

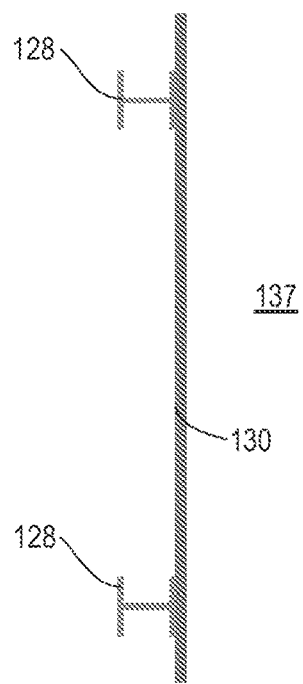
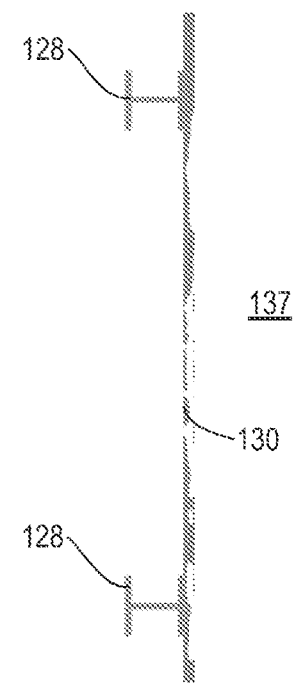
FIG. 6A  FIG. 6B
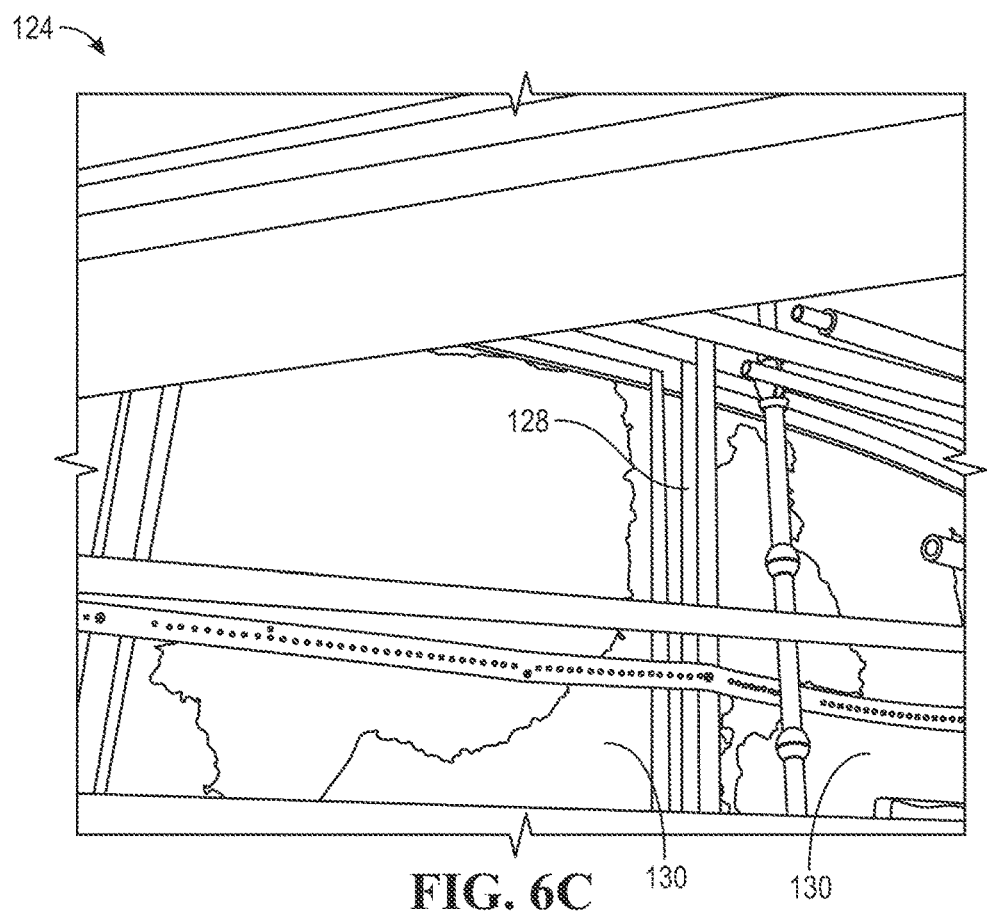
FIG. 6C

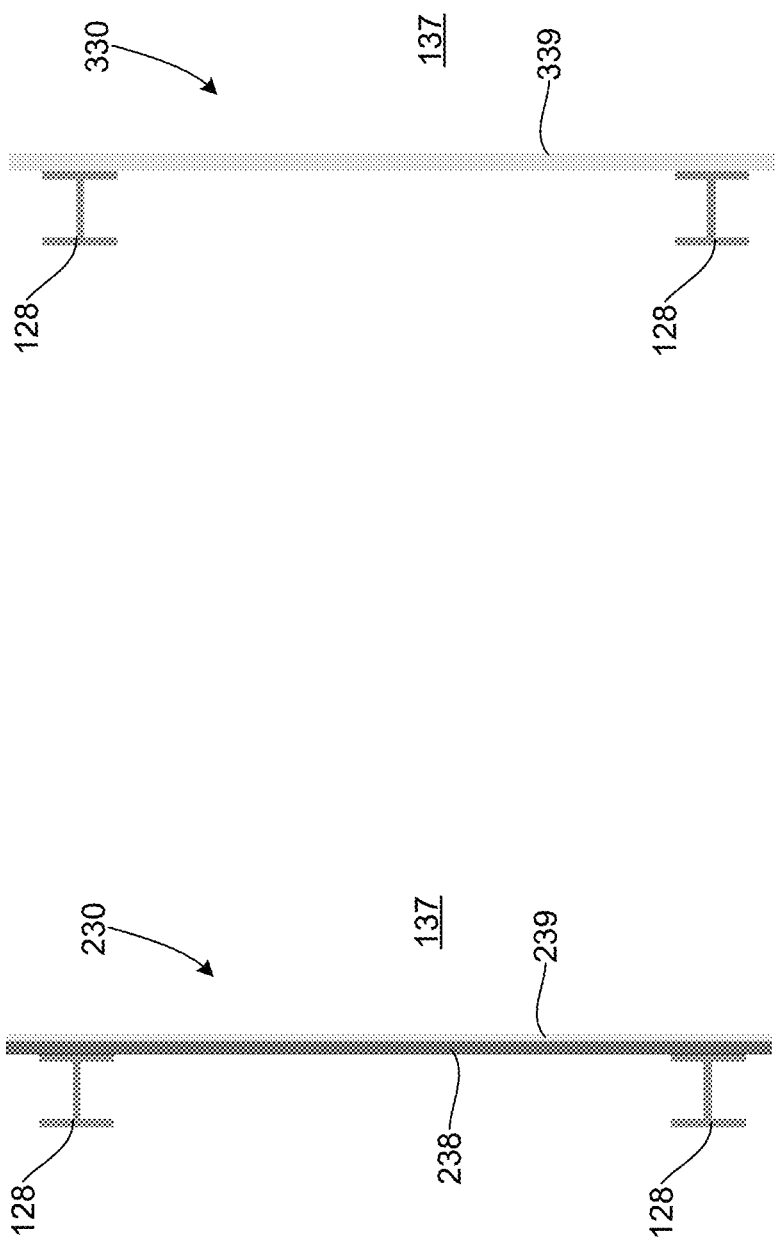

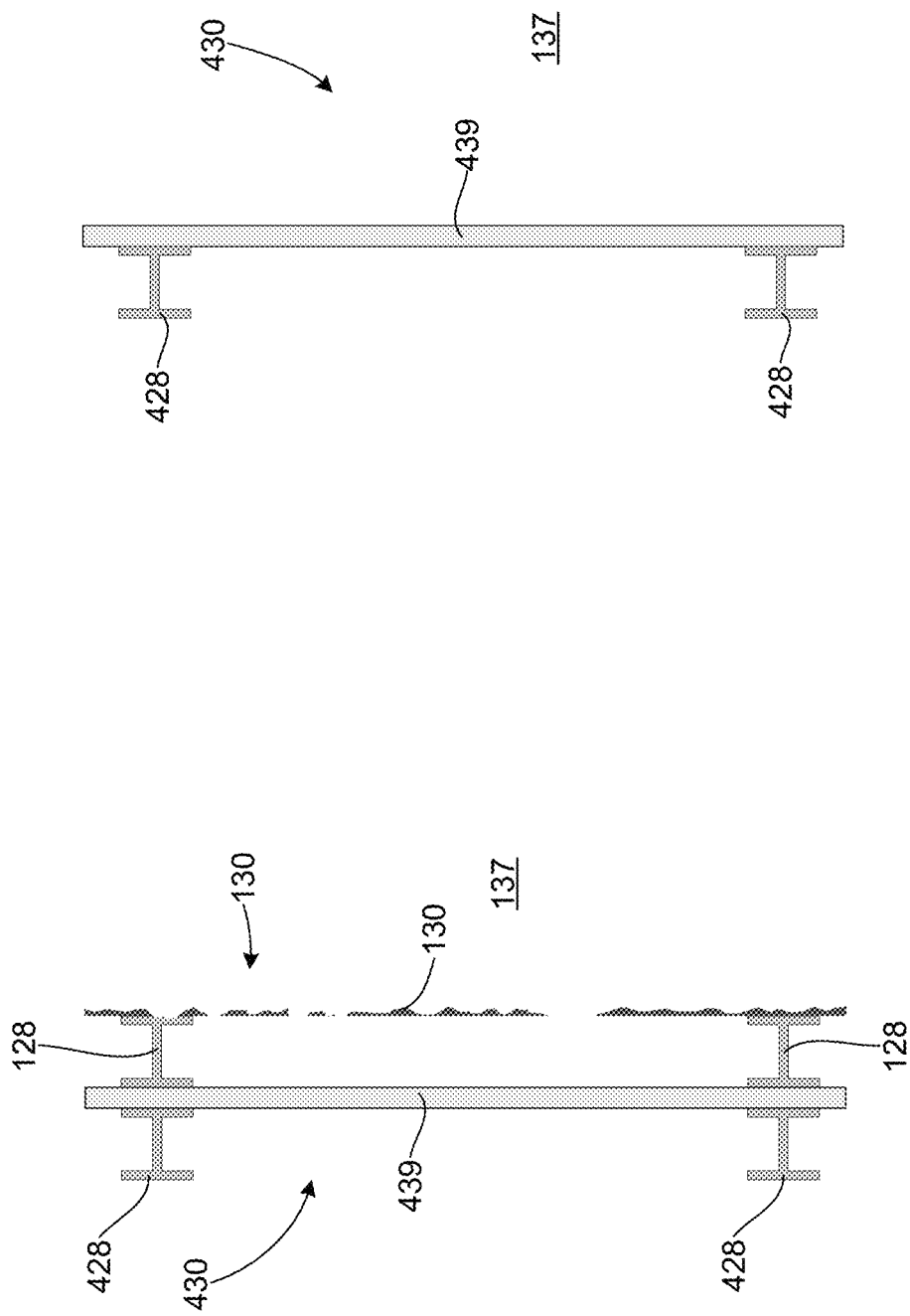

METHODS AND SYSTEMS FOR PROVIDING CORROSION RESISTANT SURFACES IN CONTAMINANT TREATMENT SYSTEMS

CROSS-REFERENCE TO RELATED APPLICATION

This non-provisional patent application claims the benefit of and priority to U.S. Provisional Patent Application No. 62/787,055, titled "METHOD AND SYSTEMS FOR PROVIDING CORROSION RESISTANT SURFACES IN SPRAY DRY ABSORBER" and filed Dec. 31, 2018, which is incorporated by reference herein in its entirety by reference thereto.

TECHNICAL FIELD

The present technology relates to systems and methods for providing corrosion resistant surfaces to contaminant treatment systems such as spray dry absorbers.

BACKGROUND

Coke is a solid carbon fuel and carbon source used to melt and reduce iron ore in the production of steel. Coking ovens have been used for many years to convert coal into metallurgical coke. In one process, known as the "Thompson Coking Process," coke is produced by batch feeding pulverized coal to an oven that is sealed and heated to very high temperatures for 24 to 48 hours under closely-controlled atmospheric conditions. During the coking process, the finely crushed coal devolatilizes and forms a fused mass of coke having a predetermined porosity and strength. Volatile gases emitted during the coking process are directed out of the coke oven and eventually pass into a heat recovery steam generator, which cools the flue gases so that vaporized contaminants within the flue gas condense and precipitate, before passing into a flue gas desulfurization system, which reduces the acidity and neutralizes acids present within the flue gas. The cooled and neutralized flue gas is then provided to a baghouse, which collects particulate matter, and the remaining flue gas is vented into the atmosphere.

The desulfurization system includes a barrel having an interior area defined by metallic wall plates and vertical supports that hold the wall plates in position. When the flue gas is received at the desulfurization system, the flue gas is sprayed into the interior area of the desulfurization system and mixed with a water-based neutralizing solution that is configured to neutralizes and cool the flue gas. As droplets of the mixture are sprayed into the interior area of the barrel, some of the droplets can dry to form a powder. Other, droplets, however, may stay wet for a prolonged period. When the droplets enter the interior area, some of the droplets are directed toward sidewalls of the barrel. While the dry droplets impact the wall plates and simply continue to fall down, some of the wet particles can adhere to the wall plates. However, the wall plates are typically formed from carbon steel, which is susceptible to corrosion from the acidic compounds as well as any unreacted neutralizing solution. Over time, the steel wall plates can become extremely corroded, which requires the flue gas desulfurization system to be shut down as the corroded panels are replaced, which can sometimes result in the coke plant exceeding environmental limits. Accordingly, there is a need for an improved desulfurization system that is less susceptible to corrosion from acidic compounds within the flue gas.

BRIEF DESCRIPTION OF THE DRAWINGS

FIG. 6A shows a top view of a conventional wall plate before being corroded by corrosive contaminants in the flue gas and FIGS. 6B and 6C show wall plates after being corroded.

FIG. 7 shows a top view of a wall plate having a steel portion cladded with an alloy portion, in accordance with embodiments of the present technology.

FIG. 8 shows a top view of a wall plate formed entirely from a corrosion-resistant alloy, in accordance with embodiments of the present technology.

FIG. 11A shows a top view of a corroded wall plate that has been retrofitted with a new wall plate having a corrosion-resistant alloy portion using the method shown in FIG. 10, and FIG. 11B shows a top view of the new wall plate from FIG. 11A after the corroded wall plate has been removed, in accordance with embodiments of the present technology.

DETAILED DESCRIPTION

Specific details of several embodiments of the disclosed technology are described below with reference to particular, representative configuration. The disclosed technology can be practiced in accordance with ovens, coke manufacturing facilities, and insulation and heat shielding structures having other suitable configurations. Specific details describing structures or processes that are well-known and often associated with coke ovens but that can unnecessarily obscure some significant aspects of the presently disclosed technology, are not set forth in the following description for clarity. Moreover, although the following disclosure sets forth some embodiments of the different aspects of the disclosed technology, some embodiments of the technology can have configurations and/or components different than those described in this section. As such, the present technology can include some embodiments with additional elements and/or without several of the elements described below with reference to FIGS. 1-12B.

For the sake of simplicity, the technology disclosed herein is described with respect to its application to a spray dry absorber. However, it should be appreciated that the technology disclosed herein is not limited to use in spray dry absorbers. Rather, the technology disclosed herein is applicable to any contaminant treatment systems that may be susceptible to corrosion due to, for example, the material being treated therein (e.g., high chlorine or sulfur species), incomplete particle drying, etc. In one non-limiting example, the technology described herein can be employed in dry scrubbing systems, such as a circulating dry scrubber. Circulating dry scrubbers differ from spray dry absorbers in that circulating dry scrubbers use a riser system and do not have atomizers. However, because circulating dry scrubbers are used to process high chloride content gases, they are susceptible to corrosion and can thus benefit from the technology described herein. Still other non-limiting examples include contaminant treatment systems used in trash to steam plants and municipal solid waste burning plants.

Figure 1:
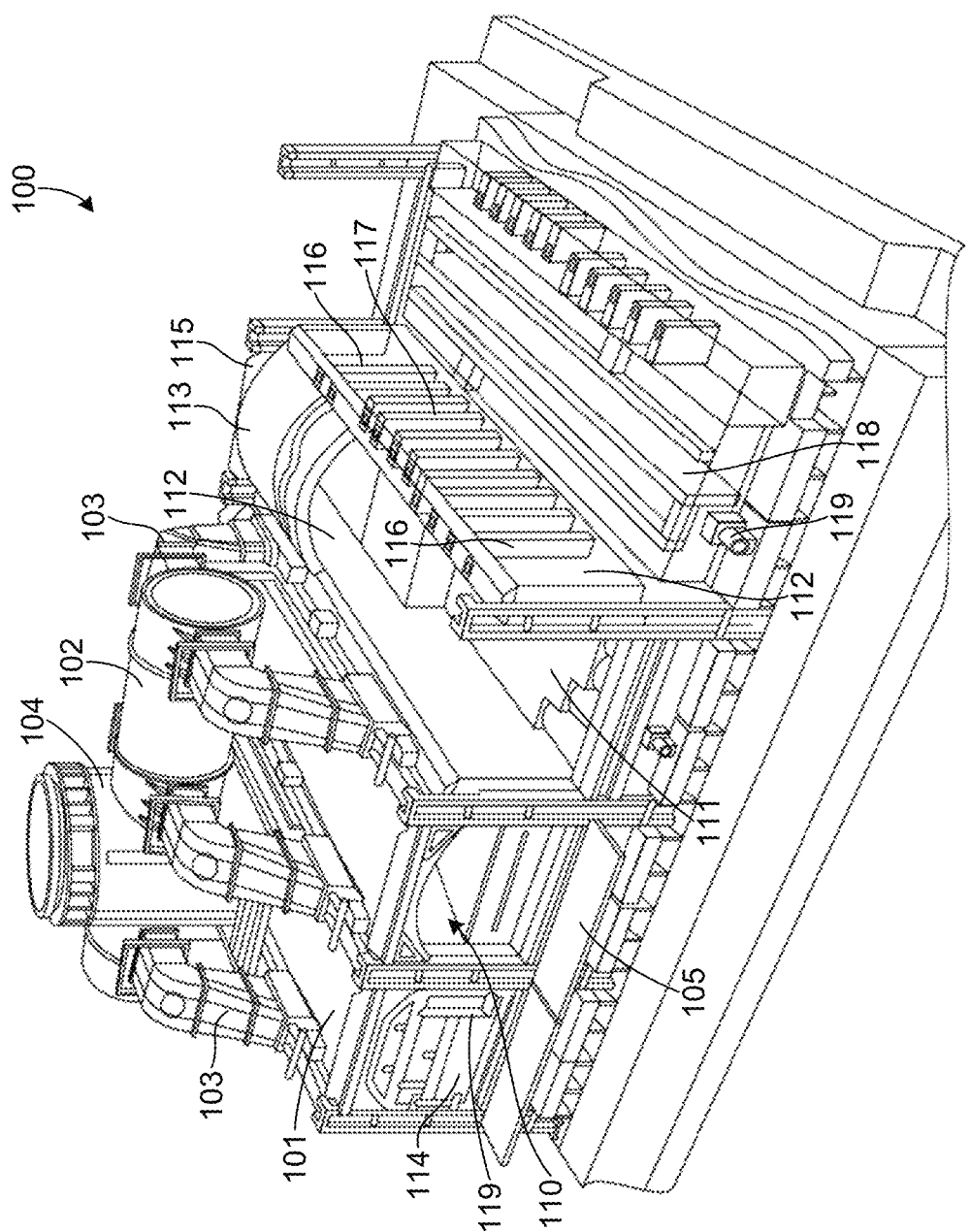
FIG. 1 is an isometric, partial cut-away view of a portion of a horizontal heat recovery/non-recovery coke plant configured in accordance with embodiments of the present technology.

Referring to FIG. 1, a coke plant 100 which produces coke from coal in a reducing environment is illustrated. FIG. 1 illustrates four ovens 101 with sections cut away for clarity. Each oven 101 comprises an oven chamber 110 defined by a floor 111, a front door 114, a rear door 115 opposite the front door 114, two sidewalls 112 extending upwardly from the floor 111 intermediate the front 114 and rear 115 doors, and a crown 113 which forms the top surface of the oven chamber 110. The oven 101 can also include a platform 105 adjacent to the front door 114 that a worker can stand and walk on to access the front door and the oven chamber 110. In operation, coke is produced in the ovens 101 by first loading coal into the oven chamber 110, heating the coal in an oxygen depleted environment, driving off the volatile fraction of coal and then oxidizing the volatiles within the oven 101 to capture and utilize the heat given off. The coal volatiles are oxidized within the ovens over a 48-hour coking cycle and release heat to regeneratively drive the carbonization of the coal to coke. The coking cycle begins when the front door 114 is opened and coal is charged onto the floor 111. The coal on the floor 111 is known as the coal bed. Heat from the oven (due to the previous coking cycle) starts the carbonization cycle. Preferably, no additional fuel other than that produced by the coking process is used. Roughly half of the total heat transfer to the coal bed is radiated down onto the top surface of the coal bed from the luminous flame and radiant oven crown 113. The remaining half of the heat is transferred to the coal bed by conduction from the floor 111 which is convectively heated from the volatilization of gases in sole flue 118. In this way, a carbonization process "wave" of plastic flow of the coal particles and formation of high strength cohesive coke proceeds from both the top and bottom boundaries of the coal bed at the same rate, preferably meeting at the center of the coal bed after about 45-48 hours.

In operation, volatile gases emitted from the coal positioned inside the oven chamber 110 collect in the crown 113 and are drawn downstream in the overall system into downcomer channels 117 formed in one or both sidewalls 112. The downcomer channels 117 fluidly connect the oven chamber 110 with the sole flue 118 positioned. The sole flue 118 forms a circuitous path beneath the floor 111 and volatile gases emitted from the coal can pass through the downcomer channels 117 and enter the sole flue 118, where they combust and emit heat that supports the reduction of coal into coke. Uptake channels 116 are formed in one or both sidewalls 112 of the oven chambers 110 and are fluidly coupled between the sole flue 118 and uptake ducts 103 such that the combusted volatile gases can leave the sole flue 118 by passing through the uptake channels 116 toward the uptake ducts 103. The uptake ducts 103 direct the volatile gases into the common tunnel 102, which transports these gases downstream for further processing.

Figure 2:
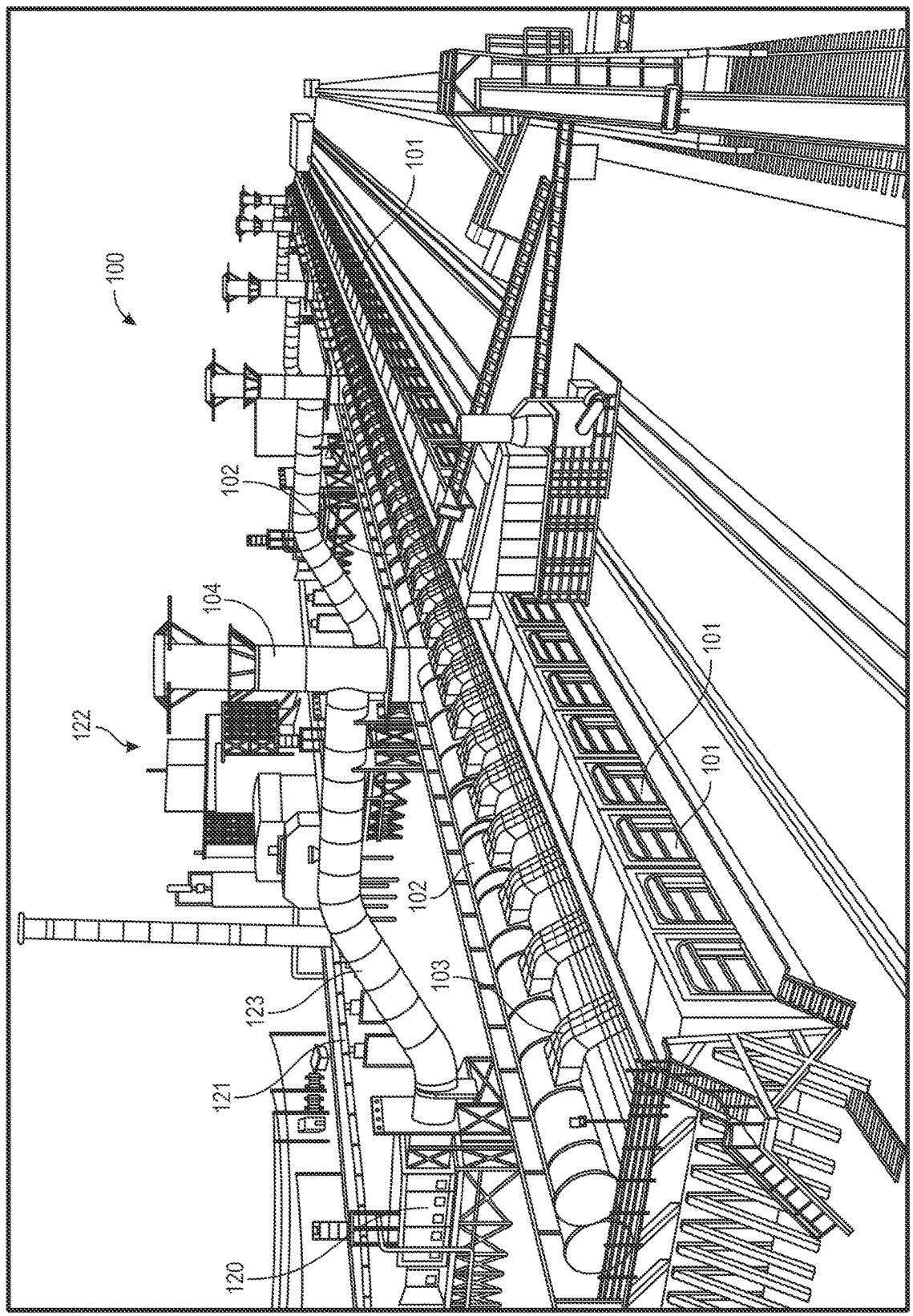
FIG. 2 is a perspective view a coke plant configured in accordance with embodiments of the present technology.

FIG. 2 shows a perspective view of the coke plant 100. After passing into the common tunnel 102 from the uptake ducts 103, the common tunnel 102 directs the flue gases, which can often be at a temperature greater than 2000° F., toward one or more heat recovery steam generators (HRSG) 120. The HRSGs can cool the flue gas to a temperature between 400° F. and 500° F. by directing the heated gas over a plurality of water-containing pipes and using the heat from the flue gas to convert liquid water into steam. A cooled gas duct 121 transports the cooled gas from the HRSG 120 to a flue gas desulfurization system 122, which is used to remove sulfur dioxide, hydrochloric acid, sulfuric acid, sulfur trioxide, and other contaminants from the flue gas. Fluidly connected and further downstream are a baghouse for collecting particulates, a draft control system for controlling air pressure and/or a draft within the system, and a main gas stack for exhausting cooled and treated exhaust to the environment (not shown in FIG. 2). Steam lines interconnect the heat recovery steam generators and a cogeneration plant so that the recovered heat can be utilized. The coke plant 100 can also be fluidly connected to a bypass exhaust stack 104 that can be used to vent hot exhaust gases to the atmosphere in emergency situations.

Figure 3:
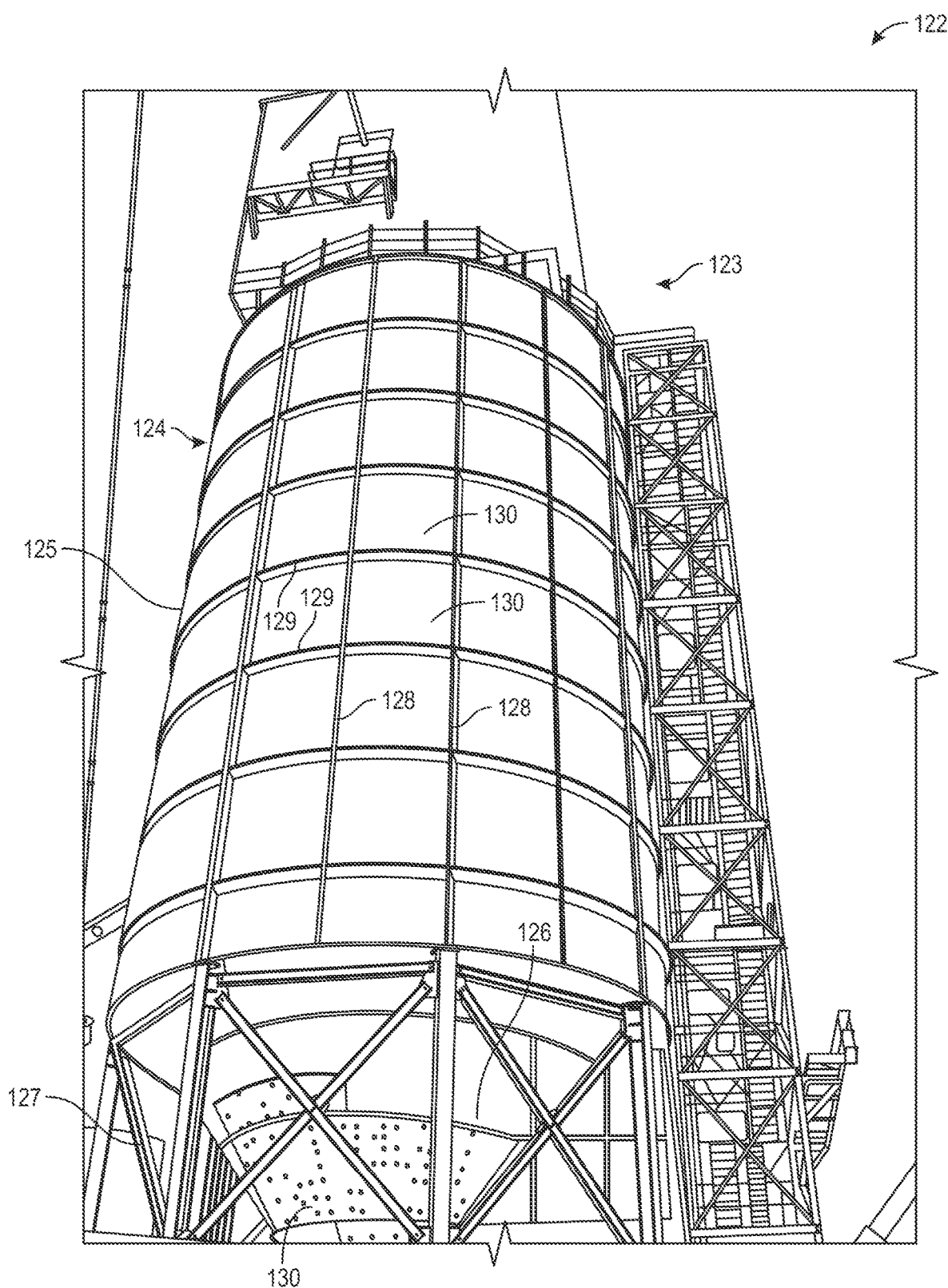
FIG. 3 is an isometric view of a spray dry absorber flue gas desulfurization system configured in accordance with embodiments of the present technology.

FIG. 3 shows an isometric view of a representative flue gas desulfurization system 122. The flue gas desulfurization system 122 includes a spray dry absorber 123. The spray dry absorber 123 includes a barrel 124 having a cylindrical portion 125 and a cone portion 126 coupled to the bottom of the cylindrical portion 125. A support portion 127 at least partially surrounds the cone portion 126 and can be used to support the weight of the barrel 124 and keep the cone portion 126 off of the ground. The barrel 124 includes a plurality of vertical supports 128 and a plurality of horizontal supports 129. The vertical supports 128 are distributed around a circumference of the cylindrical portion 125 and extend along a height of the cylindrical portion 125 while the horizontal support columns 128 are distributed along the height of the cylindrical portion 125 and extend around the circumference of the cylindrical portion 125. The barrel 124 also includes a plurality of wall plates 130 coupled to the vertical supports 128 and the horizontal supports 129. The cone portion 126 also includes wall plates 130. The vertical supports 128 and the horizontal supports 129 can support the wall plates 130 such that the wall plates 130 form sidewalls for the cylindrical portion 125 and can define an interior area of the barrel 124. A roof of the barrel 130 can also include wall plates 130.

Figure 4:
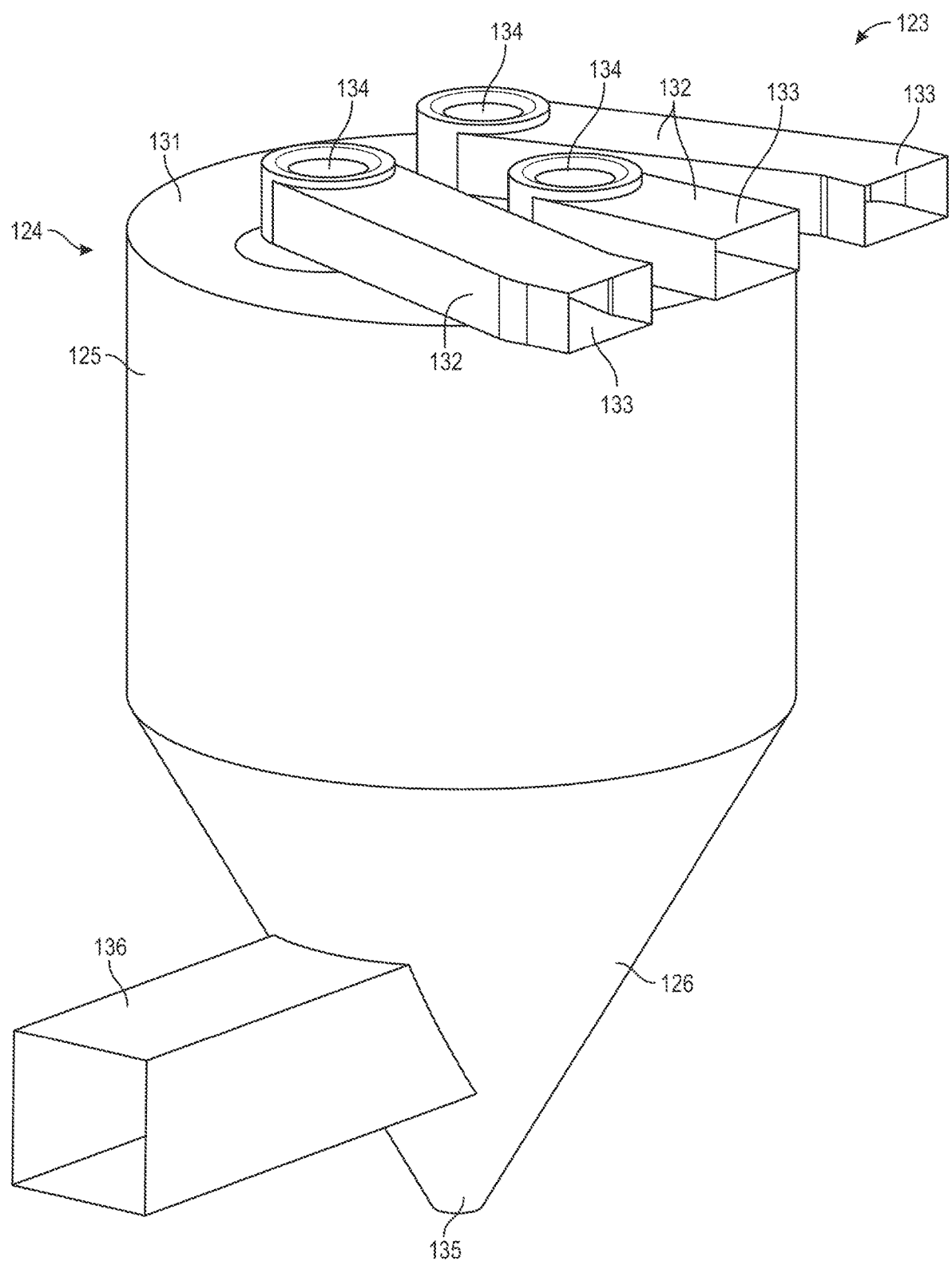
FIG. 4 is an isometric view of a barrel for a spray dry absorber configured in accordance with embodiments of the present technology.

FIG. 4 shows an isometric view of the barrel 124. The barrel 124 includes one or more inlets 132 formed in a roof 131 of the barrel 124. In the illustrated embodiment, the barrel 124 includes three inlets 132. In other embodiments, the barrel 124 can include one inlet 132, two inlets 132, or more than three inlets 132. In the illustrated embodiment, each of the inlets 132 includes a flue gas disperser 133 configured to receive flue gas 133 from the HRSG 120 and a rotary atomizer 134 configured to receive a neutralizing solution (generally including a neutralizing agent) and convert the neutralizing solution into a spray or atomized cloud of fine droplets. With this arrangement, the flue gas dispersers direct the received flue gas toward the cloud of neutralizing solution so that the flue gas and the droplets of neutralizing solution can mix together. In other embodiments, however, the desulfurization system can include other means for introducing and mixing the neutralizing solution and the flue gas.

After the neutralizing solution, which in some embodiments is an alkaline slurry formed from, e.g., lime and water, but which can also include other neutralizing agents such as bicarbonates, and the flue gas are mixed, the mixture is directed into the interior area of the barrel 124. By atomizing the neutralizing solution, efficient contact between the flue gas and the neutralizing solution can occur, which allows for a rapid mass transfer between the flue gas and the neutralizing solution as the alkaline solution reacts with the acidic compounds in the flue gas. The mixture is dispersed into the interior area of the barrel 124 as droplets, and these droplets fall through the cylindrical portion 125 toward the cone portion 126. As the droplets fall, the neutralizing agent from the neutralizing solution (e.g., lime) reacts with the acidic compounds in the flue gas to form generally inert compounds. While this reaction takes place, remnant heat from the flue gas causes the water from the neutralizing solution to evaporate such that some of the droplets dry out and form a powder. This process typically also causes the powder to cool to a temperature between 235° F. and 250° F. Some of the dry powder, which is now cooled and neutralized, falls through an opening 135 formed in the bottom of the cone portion 126 and is collected for disposal and/or further processing while the rest of the dry powder is carried by the remaining gaseous components of the flue gas and exits the barrel 124 via outlet 136. From there, the gaseous components and the uncollected dry powder are directed to a baghouse that collects some or all of the remaining powder. The now cleaned and cooled flue gas is then exhausted into the atmosphere via the main gas stack. In some embodiments, the powder collected from the bottom of the cone portion 126 can be provided to a wet scrubber that can recover unused lime from the powder. While the neutralizing solution typically comprises lime and water, in some embodiments, the neutralizing solution can include caustic soda, fly ash, and/or sodium hydroxide in addition to, or instead of, lime.

Figure 5:
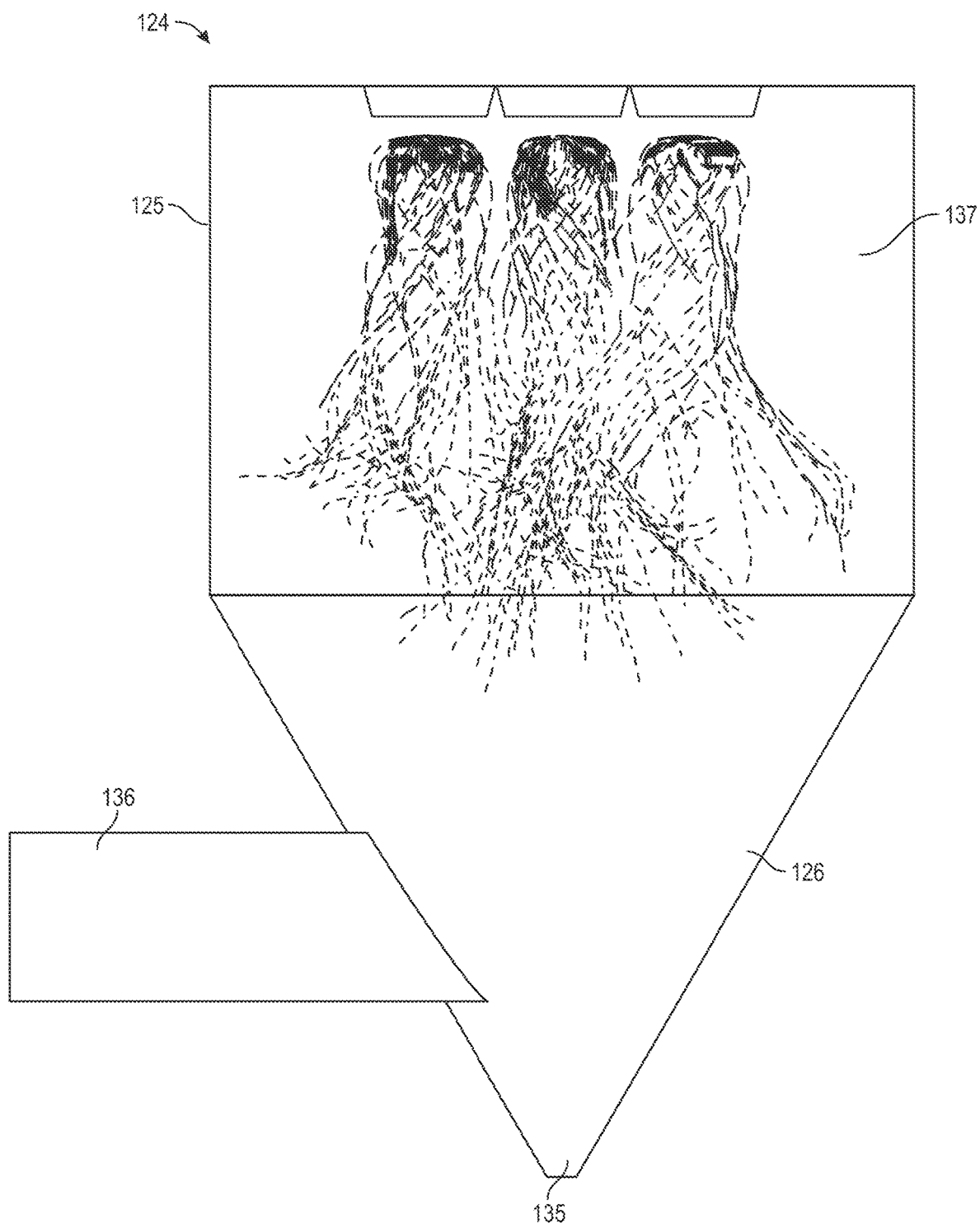
FIG. 5 is a diagram showing a spray pattern of droplets of a mixture formed from flue gas and a neutralizing solution that are sprayed into the barrel shown in FIG. 4.

When the droplets of flue gas contaminants and neutralizing solution are dispersed into the interior area of the barrel 124, the droplets tend to flow generally downwards toward the cone portion 126. However, some of the droplets can be directed toward the sidewalls of the barrel 124. FIG. 5 shows an example of the dispersal pattern of the droplets as they are introduced into interior area 137 of the barrel 125. While the droplets tend to flow toward cone portion 126, turbulence within the interior area can cause some of the droplets to flow toward the sidewalls of the barrel 125. In some embodiments, the droplets can even be directed upwards toward the roof of the barrel 125. If the individual droplets have completely dried into the powder by the time they reach the sidewalls, then the powder simply impacts the wall plates 130 and continues to fall toward the cone portion 126. However, not all of the droplets are completely dry by the time they reach the sidewalls.

In comparison to flue gases exhausted from coal burning power plants, flue gases exhausted from heat recovery coke ovens typically have much higher concentrations of acids, and in particular, hydrochloric acid. For example, flue gas exhausted from heat recovery coke ovens can sometimes have a concentration of hydrochloric acid that is 10 times higher (or more) than flue gas exhausted from coal burning power plants. This is primarily because heat recovery coke plants extract 80-90% of all of the chlorides in the coal while only burning about 25% of the coal and all of this is expelled from the oven as volatile matter during the coking process. Because of this, the flue gas received by the desulfurization system can have very high concentrations of hydrochloric acid (HCl) and sulfur dioxide ($SO_2$). When the flue gas is then mixed with the neutralizing solution, the neutralizing agent (e.g., lime) in the neutralizing solution reacts with some of the hydrochloric acid and sulfur dioxide to form calcium chloride ($CaCl_2$), calcium sulfite ($CaSO_3$), and calcium sulfate ($CaSO_4$). Additionally, the sulfur dioxide can dissolve into the water component of the neutralizing solution to form sulfuric acid (HS). Calcium sulfite and calcium sulfate tend to dry very quickly. Accordingly, after being dispersed into the interior area 137, droplets having high amounts of these sulfur-containing compounds dry out quickly and form powder particles. On the other hand, calcium chloride tends to retain water and does not dry out very quickly. Because of this, droplets that have a high amount of calcium chloride can remain wet for an extended period of time after being dispersed into the interior area 137. In some instances, these droplets can remain wet until they impact the sidewalls of the barrel 124 and can sometimes stick to the wall plates 130. Further, because the flue gasses exhausted from the heat recovery coke oven have a high concentration of hydrochloric acid, the percentage of droplets dispersed into the interior area 137 that are wet enough to stick to the wall plates 130 is substantially higher than in spray dry absorbers used in coal burning power plants.

In conventional spray dry absorbers, such as those used in coal burning power plants, the wall plates 130 are typically formed entirely from steel. As such, when these wet droplets stick to the wall plates 130, the steel can be exposed to the various chemicals present in the droplets, including calcium chloride, calcium sulfite, and calcium sulfate, as well as any unreacted hydrochloric acid and/or sulfuric acid. Hydrochloric acid, sulfuric acid, and the calcium ions from the various calcium-containing compounds are all typically corrosive to steel. FIG. 6A shows a top view of a wall plate 130 that is formed from steel before being exposed to corrosive compounds and FIG. 6B shows a top view of the same wall plate 130 after the wet droplets hit the being exposed to the compounds. Because of the high concentration of hydrochloric acid in the flue gas exhausted by the heat recovery coke oven, a large number of droplets that impact the wall plate 130 can be sufficiently wet enough to stick to the wall plate 130. As a result, the steel in the wall plate 130 is exposed to the corrosive compounds in the droplets, which can allow the corrosive compounds to corrode the steel wall plate 130. Further, ash within the flue gas and unreacted neutralizing agent (e.g., lime) from the neutralizing solution can sometimes be trapped against the steel wall plates by the wet droplets, which can lead to under deposit corrosion of the steel wall. Accordingly, deposits that adhere to the wall plates 130 can cause corrosion and pitting in the steel, which can sometimes result in holes being formed through the wall plates 130 that expose the interior area 137 to the outside ambient air. When this happens, cool air from outside of the barrel 124 can be drawn into the interior area 137, which cools the gases and metal near the holes.

As the metal and air cool, moisture in the air can condense on the wall plate near the hole and can react with the with the acids from the flue gas and the reacted lime, which can cause the metal near the hole to also corrode. Accordingly, the formation of a hole through one of the wall plates 130 can accelerate the rate that the wall plate 130 corrodes. FIG. 6C shows an isometric view of an exterior portion of the barrel 124 having two wall plates 130 that have been completely corroded due to deposits that have adhered to them. Further, if the portions of the wall plates 130 that are positioned directly adjacent to the vertical supports 128 or horizontal supports 129 corroded enough to expose the vertical or horizontal supports 128, 129, the corrosive compounds can also corrode through these supports, which can threaten the structural integrity of the barrel 124. In the illustrated embodiments, the wall plates 130 susceptible to corrosion are depicted as being part of the sidewalls of the cylinder portion 125 of the barrel 124. However, this is only an example. Other portions of the barrel, such as the wall plates 130 that form the cone portion 126 or that form the roof 131 of the barrel 124, or the outlet 136 are also at risk of corrosion from the corrosive compounds. Additionally, other portions of the coke plant 100, such as the baghouse, the baghouse ash and dust collection bin, and the cross-over section between the baghouse and the desulfurization system, can also be subject to corrosion from the corrosive compounds in the flue gas, as well as corrosion caused by the leakage of outside air into the system.

To reduce and/or prevent the barrel of the spray dry absorber from being corroded by the corrosive contaminants of the flue gas, the barrel can be formed from wall plates that are at least partially formed from an alloy that is resistant to corrosion due to sulfur species, chlorine species, or both. For example, the wall plates can be formed from an alloy resistant to sulfuric acid and/or hydrochloric acid. FIG. 7 shows a top view of a wall plate 230 having a steel portion 238 cladded with an alloy portion 239 and that is coupled to two vertical supports 228. The wall plate 230 is attached to the vertical supports 228 such that the alloy portion 239 faces toward the interior area 237 of the barrel 224 while the steel portion 238 faces away from the interior area 237. In some embodiments, the steel portion 238 can be cladded with the alloy portion 239 by welding a plate formed from the corrosion-resistant alloy to a steel plate. In other embodiments, the steel portion 238 can be cladded with the alloy portion 239 by papering a thin foil/plate formed from the alloy to a steel plate or by positing the alloy onto the steel plate. In still other embodiments, however, the wall plate 230 may not even include a steel portion 238. For example, FIG. 8 shows a top view of a wall plate 330 that includes an alloy portion 339 coupled between to two vertical supports 128 but that does not include a steel portion. In this example, the wall plate 330 is formed entirely from the corrosion-resistant alloy. While the corrosion-resistant alloy can sometimes be weaker than steel, the vertical and horizontal supports 227 and 228 provide enough structural integrity for the barrel 224 that the lack of a steel portion 238 does not significantly affect the structural performance of the barrel 224.

The alloy portion 239 is formed from an alloy that is resistant to corrosion due to sulfur species, chlorine species, or both (e.g., sulfuric acid, hydrochloric acid, etc.). In some embodiments, the alloy portion 239 comprises a Nickel-Chromium alloy such as Alloy 20, which has between 32% and 38% Nickel, between 19% and 21% Chromium, between 2% and 3% Molybdenum, between 3% and 4% Copper, and a balance of Iron. In other embodiments, however, the alloy portion 239 can include a different Nickel-Chromium-Iron alloy, such as Inconel alloy, an Incoloy alloy, a Monel alloy, or a Hastelloy alloy. Weldable stainless steel alloys, such as AL-6XN can also be used. In still other embodiments, the alloy portion 239 can comprise a duplex or super duplex alloy, which offer high resistance to corrosion from sulfur and chlorine species and are rela- tively inexpensive. However, duplex and super duplex alloys typically undergo a phase transition when they are heated above certain temperatures and may no longer have the desired amount of resistance to corrosion after undergoing such a phase transition. For example, duplex alloy SS2205 undergoes a phase transition when heated to temperatures above 500° F. Accordingly, wall plates 230 having alloy portions 239 formed form duplex or super duplex alloys may only be installed in desulfurization systems where the flue gas is below the phase transition temperature of the specific alloy.

Figure 9:
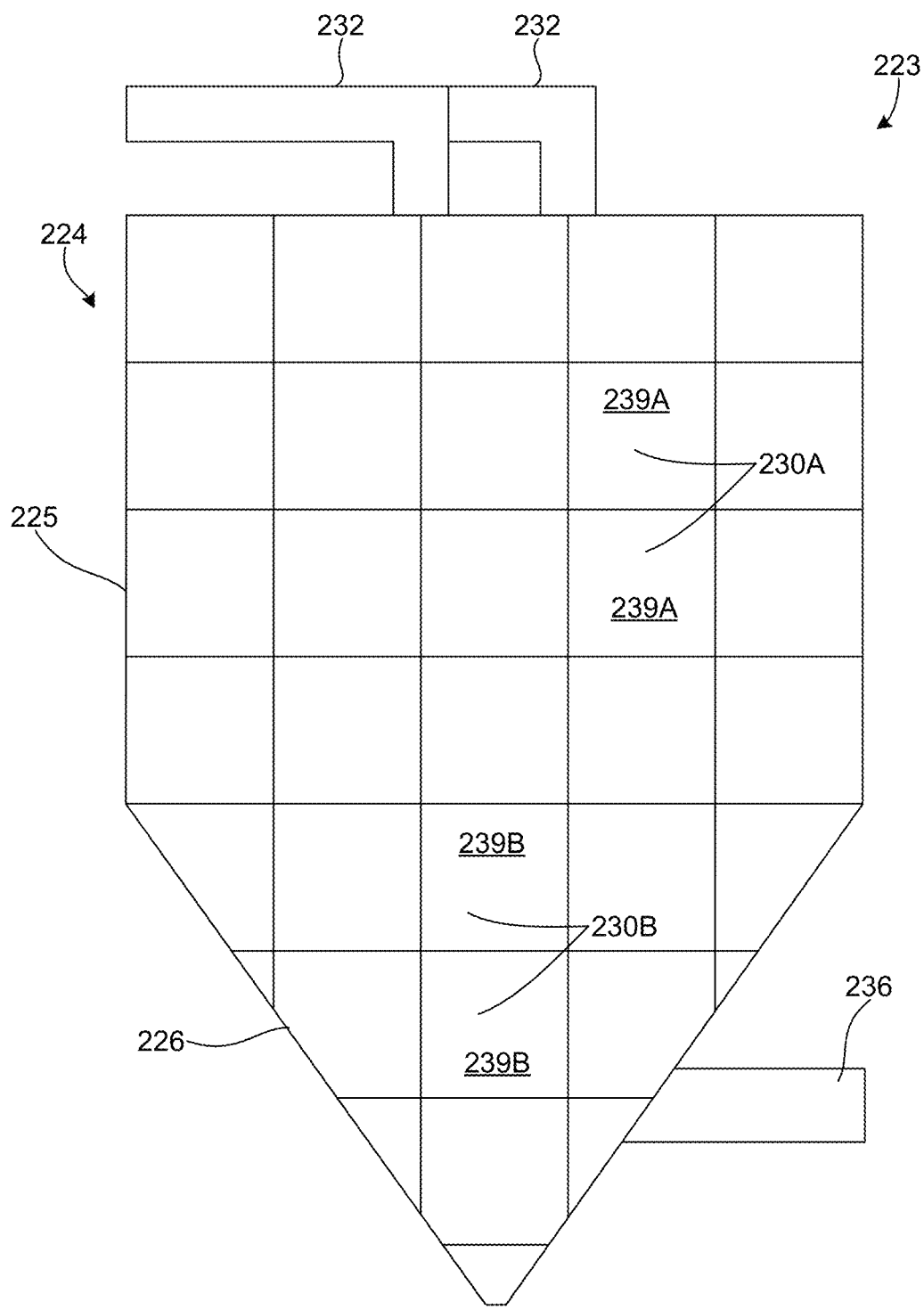
FIG. 9 shows a cross-sectional view of a spray dry absorber having a barrel that includes wall plates formed from corrosion resistant alloys, in accordance with embodiments of the present technology.

In some embodiments, all of the wall plates 230 for the barrel 224 have alloy portions 239 formed from a single alloy. In other embodiments, however, some of the wall plates 230 can include alloy portions 239 formed from a first corrosion-resistant alloy while other wall plates 230 can include alloy portions 239 formed from a second corrosion-resistant alloy. FIG. 9 shows a cross-sectional view of a spray dry absorber 223 having barrel 224 that includes a cylindrical portion 225, which can include first wall plates 230A having first alloy portions 239A, and a cone portion 226, which can include second wall plates 230B having second alloy portions 239B. With this arrangement, the barrel can include wall plates 230 formed from two different corrosion-resistant alloys. For example, because the flue gas provided to the inlets 232 can sometimes be hotter than the phase transition temperatures of some of duplex and super duplex alloys, duplex and super duplex alloys may not be suitable as the alloy portions 239A for the wall plates 230A. This is because the wall plates 230A are located close to the inlets 232 and are therefore more likely to contact flue gas that is hotter than the phase transition temperature of a given duplex or super duplex alloy. Instead, in some embodiments, the alloy portions 239B of the second wall plates 230B can be formed from a duplex or super duplex alloy while the alloy portions 239A for the wall plates 230A are formed from a different corrosion resistant alloy (e.g., Alloy 20) as the second wall plates 230B are located far enough away from the inlets 232 that the flue gas will be sufficiently cool by the time the gas and the droplets reach the wall plates 230B.

Figure 10:
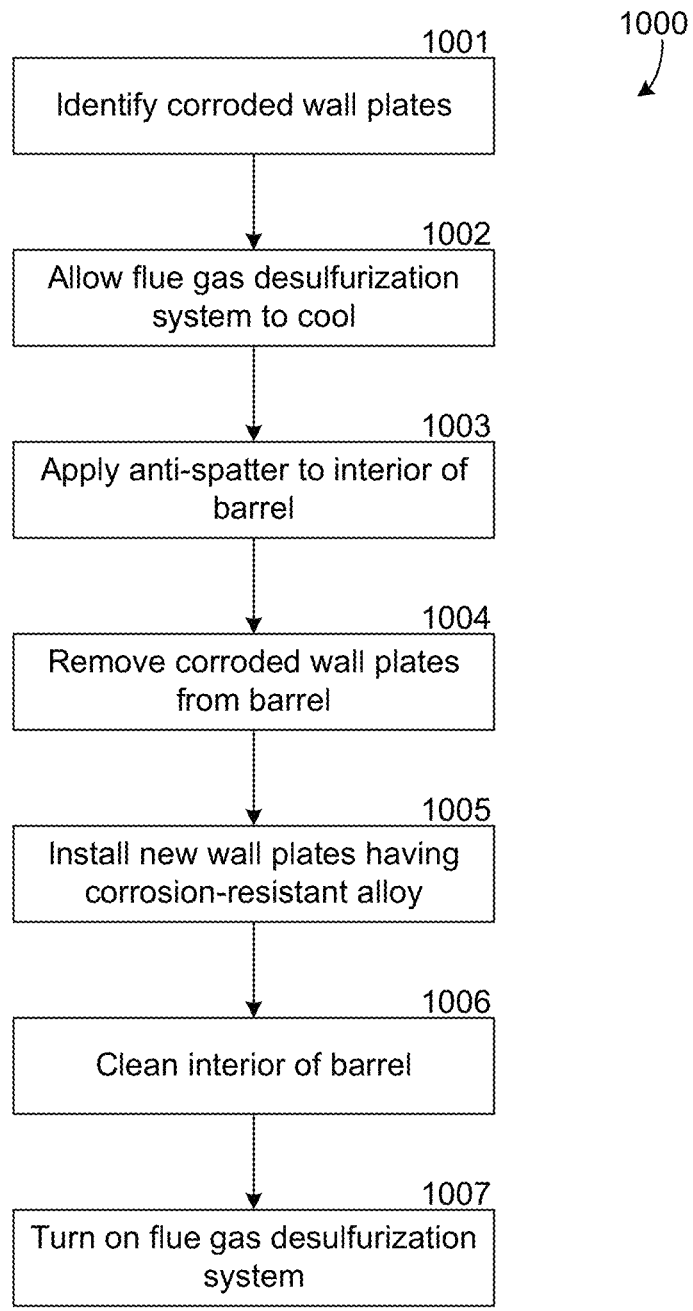
FIG. 10 shows a method for retrofitting an existing spray dry absorber with wall plates having a corrosion-resistant alloy portion, in accordance with embodiments of the present technology.

In some embodiments, the corrosion resistant alloy can be incorporated into the wall plates when the barrel is being constructed. However, because the individual wall plates are independent from each other and can be attached to and detached from the vertical and horizontal supports, existing spray dry absorbers can be retrofitted to include wall plates having the corrosion resistant alloy. For example, if it is determined that one or more of the wall plates 130 (FIGS. 3 and 6A-6C) are corroded, the corroded wall plates can be detached from the rest of the barrel and new wall plates 230 having the corrosion resistant alloy portions can be attached in their place. FIG. 10 shows a method 1000 that can be used to retrofit an existing spray dry absorber.

At step 1001, corroded wall plates are identified, and the location of these corroded wall plates is noted. The corroded wall plates can be identified using a variety of techniques. For example, the interior of the spray dry absorber can be examined by a technician during a scheduled shut-down of the system. The technician can note if individual wall plates need to be replaced immediately or if the replacement can be delayed until later. To determine the amount of corrosion present on the individual wall plates, the technician can visually examine the wall plates, can use chemical analysis, and/or can use physical measurements (e.g., thickness of the wall plate). Alternatively, a camera can be inserted into the system while the system is still in operation. Further, if the wall plates are extremely corroded, the corrosion can sometimes be detected from outside of the spray dry absorber. Leak detection can also be used to identify corroded wall plates. For example, an infrared camera can be used to detect leaks by identifying "cold" spots. Specific leak detection methods, such as helium leak detection methods can also be used. Visual inspection can also be used to identify leaks and therefore corroded wall plates. In one example, insulation formed on the exterior of the wall plates can appear "dented in", which is an indication that a leak exists in the underlying wall at the location of the "dent".

After determining that one or more of the wall plates are corroded, at step 1002, the spray dry absorber is allowed to cool. During operation of the spray dry absorber, the temperatures within the system are too hot for technicians to enter the system. Accordingly, before the corroded wall plates can be replaced, the spray dry absorber is shut down and gasses from the coke oven are temporarily directed to a different desulfurization system for processing. The system can be allowed to cool for up to 24 hours (or longer if needed) until the temperature of the system drops to a safe temperature.

After cooling, the corroded wall plates can be safely removed from the system. However, care must be taken when removing the corroded wall plates from the system to ensure that system is not damaged during the removal process as removing the corroded wall plates from the system requires cutting the carbon steel that forms the corroded wall plates, which can create slag. The corrosion-resistant alloys that form the new wall plates can be sensitive to this slag such that any contact with the carbon steel can destabilize the alloy and cause pitting or corrosion. Accordingly, at step 1003, anti-spatter spray can be applied to some or all of the wall plates within the spray dry absorber to reduce the amount of slag that can interact with the alloy. In some embodiments, the anti-spatter spray can be applied only to the exposed alloy portions on the new wall plates that have already been installed in the spray dry absorber to protect the corrosion-resistant alloy from slag or iron-containing dust that may be present within the barrel. In other embodiments, the entire interior of the barrel can be coated with the anti-spatter spray. In this way, any slag that is created by cutting the carbon steel can be cleaned off without allowing the slag to directly contact the alloy.

At step 1004, the corroded wall plates are removed from the spray dry absorber. The plates are typically welded to the horizontal and vertical supports, as well as to adjacent wall plates. Accordingly, removing the corroded wall plates typically requires the technicians to cut through metal. In some embodiments, the technicians can use a saw, a welder, and/or a plasma cutter to cut away the corroded wall plates. A grinder can also be used to clean up any metal burrs or residual welding marks created during the cutting process.

At step 1005, after removing the corroded wall plates, the new wall plates having the corrosion-resistant alloy are installed within the barrel. In some embodiments, the individual wall plates can be welded to the vertical and horizontal supports and to adjacent wall plates to secure the wall plates in place. In other embodiments, the wall plates can be installed using adhesive or mechanical fastening means, such as bolts and screws. In general, any suitable attachment means can be used to install the wall plates within the barrel.

At step 1006, after installing the new panels within the barrel, the barrel can be cleaned to remove any slag, anti-spatter spray, or any other contaminants present in the barrel before the desulfurization process is resumed. In some embodiments, a pressure washer can be used to clean the barrel manually. In other embodiments, one or more of the inlets (e.g., inlets 132 of FIG. 4) can be used to spray high-pressure water throughout the interior area of the barrel. As the barrel is washed, the dirty water can flow out of the barrel through the opening at the bottom of the cone portion and can be collected for further processing. The barrel can continue to be washed until the water flowing out of the barrel is clear and substantially free from contaminants. In some embodiments, an acid rinse can be used to clean the interior of the barrel.

At this point, the spray dry absorber is clean and is ready for further use. Accordingly, at step 1007, the system is turned on again and hot flue gasses from the coke oven can be directed toward the spray dry absorber. Replacing the corroded wall plates using this method allows existing spray dry absorbers to be upgraded and retrofitted as individual wall plates corrode instead of having to replace all of the wall plates at one time.

As noted previously, replacing the corroded wall plates with the new wall plates having a corrosion resistant alloy portion typically requires that the flue gas desulfurization system be shut down for an extended period of time, which can increase the cost of operating the coke plant and cause delays in production. Accordingly, it may not always be advisable to retrofit the existing spray dry absorbers by replacing the corroded wall plates 130. Instead, the spray dry absorber 130 can be retrofitted using a different technique. For example, FIG. 11A shows a top view of a new wall plate 430 attached to an exterior surface of a gas desulfurization plant having a corroded wall plate 130. The new wall plate 430 is attached to the existing vertical support columns 128 and new vertical support columns 428 are attached to the exterior side of the new wall plate 430. In this way, the spray dry absorber can be retrofitted with the new wall plate 430 without having to shut down the system. Further, using the new vertical support columns 428 can ensure that the system remains fully supported even if the wall plate 130 and the original support columns 128 are corroded. Accordingly, retrofitting the desulfurization system in this manner can allow the system to continue to operate without the risk of the system prematurely failing due to corrosion. At a later point, such as during a scheduled shutdown of the desulfurization system, the wall plates 130 and the original vertical support columns 128 can be removed from the desulfurization system. As shown in FIG. 11B, at this point, the new wall plates 430 and the vertical support columns 428 can form the exterior of the spray dry absorber. In the embodiments shown in FIGS. 11A and 11B, the new wall plate 430 only includes an alloy portion 439. In other embodiments, however, the new wall plates 430 can also include a steel portion coupled to the alloy portion 439. For example, the new wall plates 430 can include a steel portion cladded with the alloy portion 439.

Figure 12A:
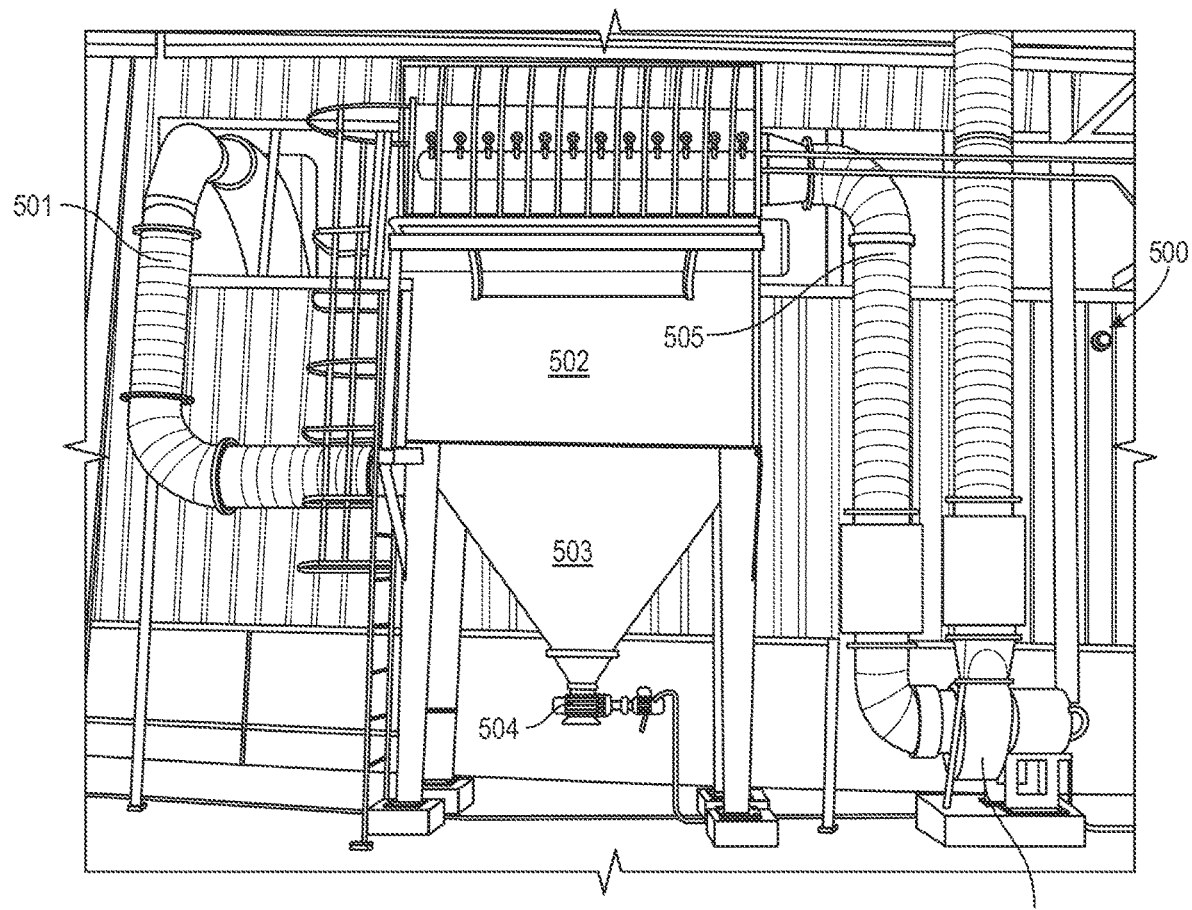
FIGS. 12A and 12B show a baghouse system configured to be fluidly coupled to the spray dry absorber shown in FIGS. 3-9 and that includes the corrosion-resistant alloy, in accordance with embodiments of the present technology.
Figure 12B:
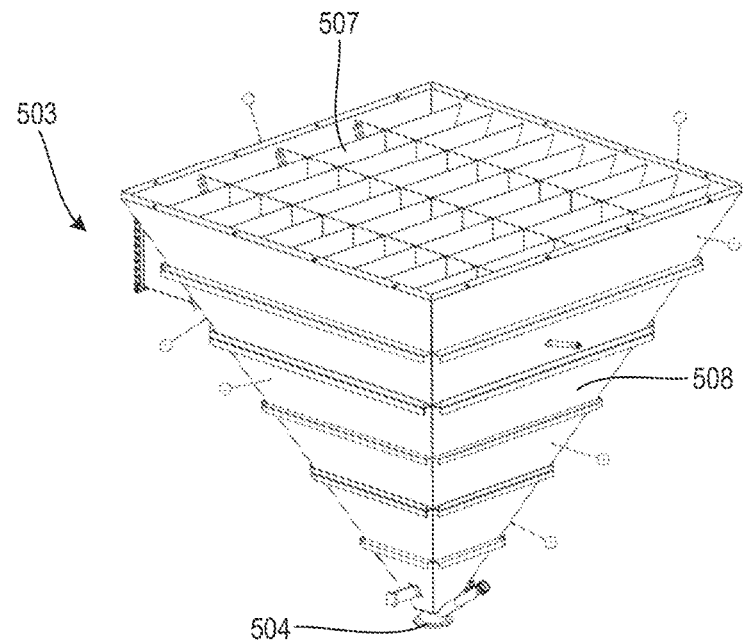

The corrosion resistant alloy can also be used in other portions of the spray dry absorber. For example, in some embodiments, the outlet 136 (FIG. 4) can include the corrosion resistant alloy. Additionally, other portions of the flue gas desulfurization system, such as the baghouse, can include the corrosion resistant alloy. FIG. 12A shows an isometric view of a baghouse system 500. After the hot flue gasses are cooled and neutralized in the spray dry absorber, the gases can leave the spray dry absorber via the outlet 236 and are directed into a cross-over section 501, which fluidly couples the spray dry absorber to the baghouse system 500. The flue gas enters the baghouse enclosure 502 and passes through a plurality of filter bags within the enclosure 502. The filter bags are formed from a fine mesh that traps dust and particulate matter from the flue gas. The filter bags are attached to a shaker mechanism that shakes the filter bags so that any trapped particles fall into a hopper 503. FIG. 12B shows an isometric view of the hopper 503. An outlet port 504 at the bottom of the hopper 503 can be used to remove the particulates from the baghouse system 500. The hopper 503 can also include a cell plate 507 that the filter bags can attach to in order to hold the bottom end of the filter bags in place. After passing through the filter bags, the cleaned gas is directed out of the enclosure 502 and into the air outlet 505. A pressure regulator 506 coupled to the air outlet 505 can be used to regulate air pressure within the enclosure 502. The air can then be emitted into the atmosphere or directed to a secondary baghouse for further cleaning.

To ensure that the corrosive particulate matter in the flue gas does not corrode the baghouse system 500, some portions of the baghouse 500 can be formed form the corrosion resistant alloy. For example, in some embodiments, at least the interior of the cross-over section 501 can be formed from the corrosion-resistant alloy. In other embodiments, the enclosure 502 can be at least partially formed from the corrosion-resistant alloy. Portions of the hopper 503 can also be formed from the corrosion-resistant alloy. For example, the hopper can be formed form a plurality of plates 508 that direct the particulates toward the outlet port 504. Before passing through the outlet port 504, the particulate matter can accumulate within the hopper 504 such that the particulate matter can be in contact with one or more of the plates 508 for a prolonged period of time. Accordingly, one or more of the plates 508 can be formed from the corrosion-resistant alloy. Other portions of the hopper 503, such as the cell plate 507 or the outlet 504 can also be at least partially formed from the corrosion resistant alloy.

By the time the flue gas leaves the spray dry absorber and reaches the cross-over section 501, the flue gas will have cooled to a temperature of approximately 300° F., which is below the phase transition temperature of duplex and super duplex alloys. Accordingly, duplex and super duplex alloys can be used with the baghouse system 500 instead of more expensive alloys like Alloy 20. The corrosion-resistant alloy can also be incorporated into other types of dry scrubbers, such as circulating dry scrubbers. For example, because circulating dry scrubbers are typically fed from the bottom of the barrel and the particulate matter is collected from the top, the sidewalls and/or the roof of the barrel can include a corrosion resistant alloy to protect these portions of the circulating dry scrubbers from corrosion.

In the previously illustrated embodiments, the wall plates are described as having corrosion-resistant metallic alloys cladded to steel plates to reduce corrosion in the barrels. In other embodiments, however, other types of corrosion-resistant materials can be used to protect the steel. For example, in some embodiments, wall plates can include steel plates that are coated with a polymer material, such as an epoxy, that is resistant to corrosion.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, the various embodiments described herein may also be combined to provide further embodiments. Additionally, although many of the embodiments are described with respect to flue gas desulfurization systems for coke ovens, it should be noted that other applications and embodiments in addition to those disclosed herein are within the scope of the present technology. For example, the disclosed wall plates can be used in gas processing systems for other industrial systems, including trash to steam plants, petroleum coke plants (including plants that produce anode grade petroleum coke), and power plants.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A contaminant treatment system comprising:
    a barrel having sidewalls that at least partially define an interior area, wherein
        the barrel comprises one or more wall plates that at least partially form the sidewalls,
        individual of the one or more of wall plates comprises an alloy that is resistant to corrosion caused by sulfur species, chlorine species, or both, and
        the individual wall plates are oriented such that the alloy is in fluid communication with the interior area;
    a first means for introducing flue gases having an elevated temperature into the interior area; and
    a second means for introducing an additive into the interior area, wherein the first and second means are configured to introduce the flue gases and the additive into the interior area such that the flue gases and the additive mix together.

2. The contaminant treatment system of claim 1, wherein the alloy comprises an Inconel alloy, an Incoloy alloy, a Monel alloy or a Hastelloy alloy.

3. The contaminant treatment system of claim 1 wherein the alloy comprises Alloy 20.

4. The contaminant treatment system of claim 1, wherein the elevated temperature is in the range of from 400° F. to 500° F.

5. The contaminant treatment system of claim 1 wherein the wall plates include a steel portion and wherein the alloy is cladded to the steel portion.

6. The contaminant treatment system of claim 1 wherein the interior area comprises:
    a first region;
    a second region; and
    a third region, wherein the first and second means are configured to introduce the flue gas and the additive into the first region such that the flue gas and additive pass through the first region and the second region to reach the third region.

7. The contaminant treatment system of claim 6 wherein the one or more wall plates comprises first wall plates, wherein the alloy comprises a first alloy, and wherein the wall plates are positioned around the second region of the interior area, the barrel further comprising:
one or more second wall plates positioned around the third region of the interior area, wherein—
individual of the one or more of second wall plates comprises a second alloy that is different from the first alloy and that is resistant to corrosion caused by sulfuric acid, hydrochloric acid, or both, and
the individual wall plates are oriented such that the second alloy is in fluid communication with the interior area.

8. The contaminant treatment system of claim 7 wherein desulfurization system is configured such that the flue gas and the additive have a temperature of less than a phase transition temperature of the second alloy when they are within the third region.

9. The contaminant treatment system of claim 1 wherein the contaminant treatment system comprises a spray dry absorber system or a circulating dry scrubber system.

10. The contaminant treatment system of claim 1, wherein the contaminant treatment system comprises a dry scrubbing system.

11. The contaminant system in claim 10, wherein the dry scrubbing system is configured for carrying out desulfurization on flue gas.

12. The contaminant system in claim 10, wherein the dry scrubbing system is configured to remove chlorine species or chlorides from flue gas.

13. The contaminant treatment system of claim 1, wherein the barrel further comprises:
one or more vertical supports positioned around the barrel, wherein an exterior side of each of the one or more of wall plates is coupled to at least one of the one or more vertical supports.

14. The contaminant treatment system of claim 1, wherein barrel comprises an outlet and the contaminant treatment system further comprises:
a baghouse; and
a cross-over section fluidly coupling the baghouse and the barrel outlet;
wherein at least a portion of the baghouse, the cross-over section, or both include the alloy.

15. The contaminant treatment system of claim 14, wherein the alloy comprises a duplex alloy or a super duplex alloy.

16. A spray dry absorber for treating acidic gases, the absorber comprising:
a barrel having sidewalls that at least partially define an interior area, wherein—
the interior area includes a first portion, a second portion, and a third portion,
the barrel includes a plurality of vertical supports and first and second pluralities of plates coupled to the plurality of vertical supports,
the first plurality of plates at least partially defines the second portion of the interior area,
the second plurality of plates at least partially defines the third portion of the interior area,
individual of the first plurality of plates comprises a first alloy,
individual of the second plurality of plates comprises a second alloy,
the first alloy is different from the second alloy, and
the individual first and second pluralities of plates are oriented such that the first and second alloys are in fluid communication with the interior area; and
a first means for introducing the acidic gases into the first portion of the interior area; and
a second means for introducing a neutralizing solution configured to at least one of cool and neutralize the acidic gases into the first portion of the interior area such that the acidic gases and the neutralizing solution mix together, wherein—
the first and second alloys are configured to resist corrosion caused by the acidic gases, the neutralizing solution, or both.

17. The spray dry absorber of claim 16 wherein the spray dry absorber is configured such that, after the acidic gases and the neutralizing solution are introduced into the first portion and mix together, the acidic gases and neutralizing solution pass from the first portion, through the second portion, and through the third portion of the interior area.

18. The spray dry absorber of claim 17 wherein the spray dry absorber is configured such that the mixture of the acidic gases and the neutralizing solution cools from a first temperature to a second temperature as the mixture passes from the first portion to the second portion and cools from the second temperature to a third temperature as the mixture passes from the second portion to the third portion.

19. The spray dry absorber of claim 18 wherein the third temperature is less than 500° F. and the second temperature is greater than 500° F.

20. The spray dry absorber of claim 16 wherein the first and second alloys are resistant to corrosion caused by deposits adhered to the first and second alloys.

21. The spray dry absorber of claim 16 wherein the first alloy is selected from the group consisting of Alloy 20, an Inconel alloy, an Incoloy alloy, a Hastelloy, and a stainless steel alloy, and the second alloy is selected from the group consisting of a duplex alloy and a super duplex alloy.

22. A desulfurization system of a coke oven system, the desulfurization system comprising:
a barrel having sidewalls that at least partially define an interior area, wherein—
the barrel comprises a plurality of wall plates that at least partially form the sidewalls,
each of the plurality of wall plates comprises a corrosion-resistant alloy, and
the wall plates are oriented such that the corrosion-resistant alloy is in fluid communication with the interior area;
a first means for introducing flue gases having an elevated temperature into the interior area, wherein the flue gases includes sulfur species, chlorine species, or both; and
a second means for introducing an additive into the interior area, wherein the first and second means are configured to introduce the flue gases and the additive into the interior area such that the flue gases and the additive mix together and wherein the additive is configured to cool the flue gases below the elevated temperature and to neutralize at least some of the sulfur species or chlorine species from the flue gases.

23. The desulfurization system of claim 22 wherein—
the corrosion-resistant alloy is resistant to corrosion caused by sulfur species, chlorine species, or both.

24. The desulfurization system of claim 22 wherein the plurality of wall plates comprises a plurality of first wall plates and the corrosion-resistant alloy comprises a first corrosion-resistant alloy, the barrel further comprising:
a plurality of second wall plates that at least partially form the sidewalls, wherein each of the plurality of second wall plates comprises a second corrosion-resistant alloy that is different from the first alloy and wherein the second wall plates are oriented such that the second corrosion-resistant alloy faces and is in fluid communication with the interior area.

25. The desulfurization system of claim 22, wherein the coke oven system is a non-recovery or heat recovery coke oven system.

* * * * *

UNITED STATES PATENT AND TRADEMARK OFFICE
CERTIFICATE OF CORRECTION

PATENT NO. : 11,395,989 B2
APPLICATION NO. : 16/729122
DATED : July 26, 2022
INVENTOR(S) : John Francis Quanci et al.

Page 1 of 1

It is certified that error appears in the above-identified patent and that said Letters Patent is hereby corrected as shown below:

In the Specification

In Column 4, Line 52, delete "130" and insert --124-- therefor.

In Column 5, Line 48, delete "125." and insert --124.-- therefor.

In Column 5, Line 51, delete "125." and insert --124.-- therefor.

In Column 5, Line 53, delete "125." and insert --124.-- therefor.

In Column 10, Line 27, delete "130" and insert --123-- therefor.

In Column 11, Line 27, delete "504" and insert --503-- therefor.

Signed and Sealed this
Twenty-ninth Day of April, 2025

Coke Morgan Stewart
*Acting Director of the United States Patent and Trademark Office*